(12) United States Patent
Erwin

(10) Patent No.: US 6,471,192 B1
(45) Date of Patent: Oct. 29, 2002

(54) RAIL-TO-POST MOUNTING BRACKET

(75) Inventor: Ronald D. Erwin, Fayetteville, GA (US)

(73) Assignee: Erwin Industries, Inc., Peachtree City, GA (US)

( * ) Notice: Subject to any disclaimer, the term of this patent is extended or adjusted under 35 U.S.C. 154(b) by 30 days.

(21) Appl. No.: 09/605,101

(22) Filed: Jun. 28, 2000

(51) Int. Cl.⁷ .................................................. B25G 3/00
(52) U.S. Cl. .................. 256/65; 403/232.1; 403/233; 403/189; 256/59; 248/219.3
(58) Field of Search ............................ 256/59, 65, 66, 256/68, 69, 19; 403/230, 232.1, 233, 234, 235, 236, 237, 189, 199; 52/263; 248/219.3, 219.4, 251

(56) References Cited

U.S. PATENT DOCUMENTS

| | | | | |
|---|---|---|---|---|
| 2,608,386 A | * | 8/1952 | Hart ............................. 256/65 |
| 2,666,238 A | * | 1/1954 | Hagedorn ..................... 403/189 |
| 3,134,566 A | * | 5/1964 | Beene, III ............... 403/189 X |
| 3,615,110 A | * | 10/1971 | Fugate ..................... 256/59 X |
| 4,114,861 A | * | 9/1978 | Long ............................ 256/67 |
| 4,667,935 A | * | 5/1987 | Moore .......................... 256/22 |
| 5,186,571 A | * | 2/1993 | Hentzschel ............... 256/65 X |
| 5,238,321 A | * | 8/1993 | Jarjoura .................... 256/65 X |
| 5,547,169 A | * | 8/1996 | Russell ........................ 256/67 |
| 5,603,580 A | * | 2/1997 | Leek et al. .............. 403/232.1 |
| 5,755,431 A | * | 5/1998 | Williams .................... 256/19 |
| 5,788,224 A | | 8/1998 | Platt |
| 5,873,671 A | * | 2/1999 | West ....................... 403/232.1 |
| 5,967,498 A | * | 10/1999 | Junell .......................... 256/19 |
| 6,017,019 A | | 1/2000 | Erwin |

FOREIGN PATENT DOCUMENTS

| | | | |
|---|---|---|---|
| GB | 20230 | * of 1899 | .................. 256/65 |
| GB | 435226 | * 9/1935 | .................. 256/65 |

* cited by examiner

Primary Examiner—Lynne H. Browne
Assistant Examiner—John Cottingham
(74) Attorney, Agent, or Firm—Garner Groff & Mehrman, P.C.

(57) ABSTRACT

A molded bracket for attaching a plastic rail to a plastic post. The bracket comprises outwardly extending fastener bosses for attaching the bracket to a post and providing the bracket with added support. The bracket further comprises a peripheral wall defining a shaped receptacle for receiving the end of a rail therein. The outwardly extending fastener bosses allow the bracket to be fastened to upright posts and to provide against vertical, horizontal and rotational movement.

20 Claims, 3 Drawing Sheets

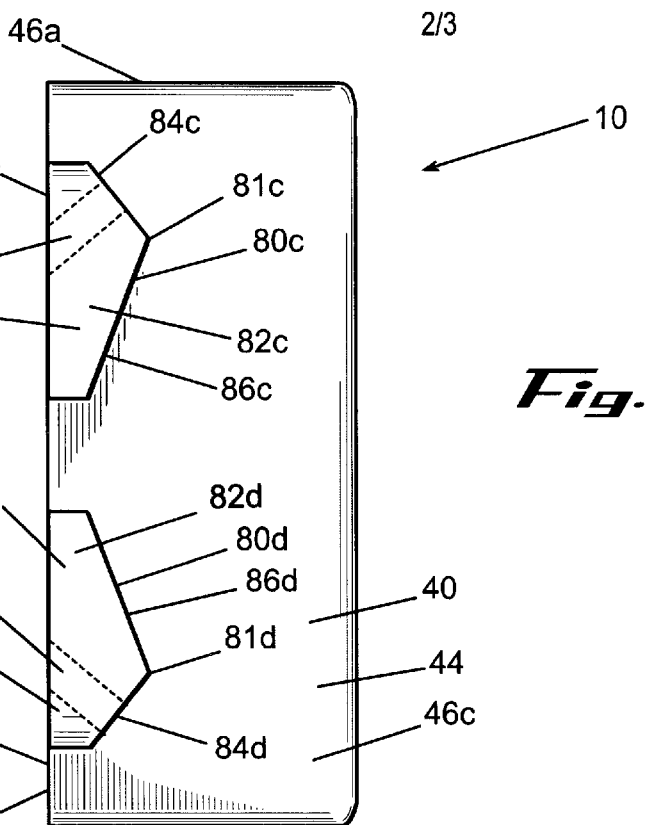
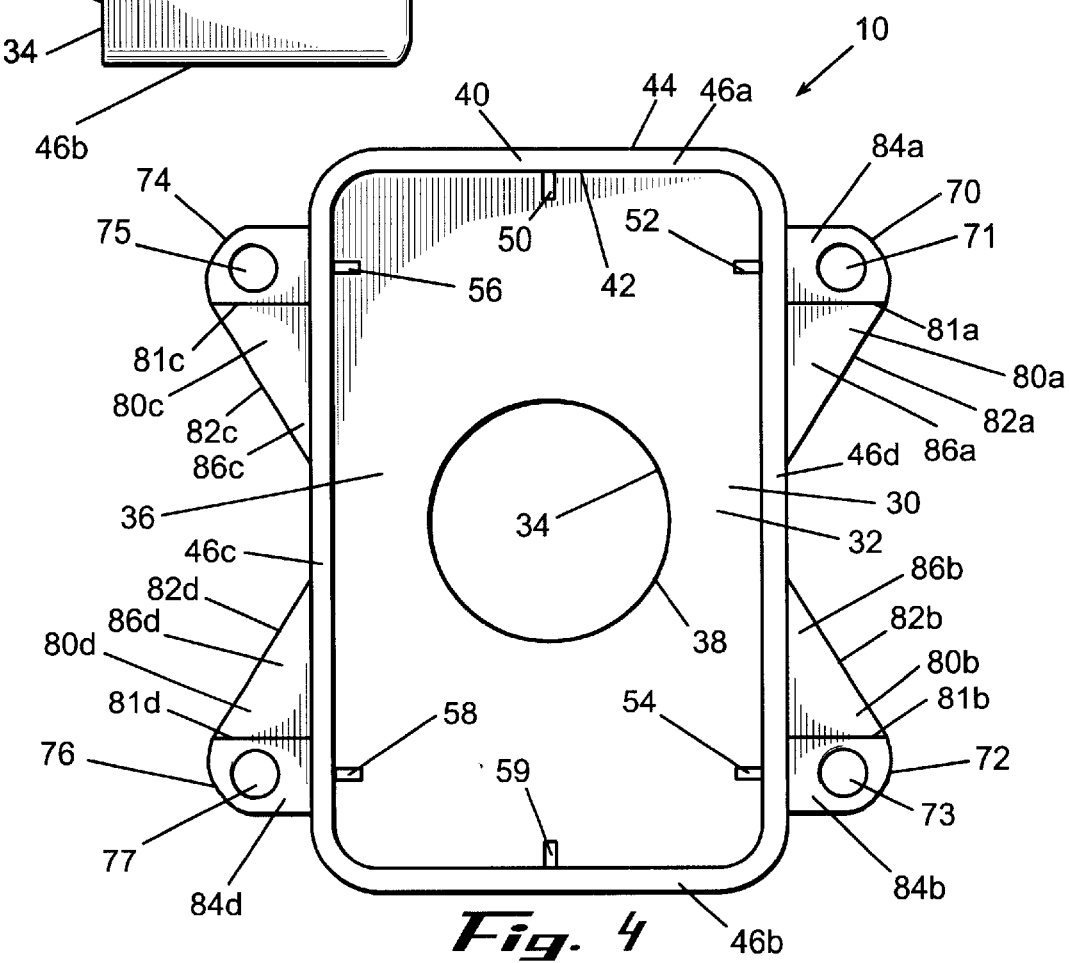

RAIL-TO-POST MOUNTING BRACKET

TECHNICAL FIELD

The present invention relates generally to building construction products and more specifically to a rail bracket which fastens a rail to a post.

BACKGROUND OF THE INVENTION

Outdoor decks are extremely popular in residential home construction. Homes and apartments, as well as a variety of other buildings, often incorporate exterior decks into their design. These decks provide convenient spaces for a variety of outdoor activities, including cookouts, dining and sunbathing, as well as other leisure activities. Moreover, decks typically are provided with a railing or perimeter fence to keep people from falling over the edge of the deck. Additionally, perimeter and accent fencing is commonly added onto landscapes, creating a boundary for foliage displays and garden areas.

Wood products traditionally have been the primary source of materials for use in decking and fence construction. However, wood products are becoming increasingly scarce due to the harvesting of trees at ever faster rates and the rather limited rate at which timber resources can be replenished. Also, environmental concerns and regulations directed to conservation or preservation of forests tend to restrict the availability of wood products. With the diminishing availability of timber resources, wood products are becoming increasingly expensive. There is, therefore, a substantial need for long-lasting substitute construction materials that can lessen the need to harvest timber resources.

One potential approach to addressing the above need is to provide substitute fence and decking products made of plastic, rather than wood. Plastic fence products provide a long-lasting alternative to wood. In addition, plastic fence products alleviate the need for costly painting and repainting. A variety of plastic building products are known. For example, U.S. Pat. No. 4,045,603 describes a three-layer synthetic construction material made from recycled waste thermoplastic synthetic resin material and cellulose fiber aggregate. This material includes face surfaces consisting essentially of re-hardened fused and rolled thermoplastic synthetic resin material bits, and an intervening core material consisting essentially of a compressed non-homogenous mixture of cellulose aggregate material bits and re-hardened fused thermoplastic synthetic resin material bits. Such plastic material can be used to create fencing elements.

Some of the essential elements of deck and fence construction are the railing and post members. The railing is typically secured to the post via a bracket. Traditional brackets, however, often are unattractive, are cumbersome to use, and often do not adequately remain secured to the post. U.S. Pat. No. 5,788,224 describes a rail attachment system having a bracket for receiving the end of a rail and a clip mounted to the post, with the clip in turn then supporting the mounting bracket. While the aesthetics of this two piece attachment system may be improved by the mounting bracket's inner location, the same feature may allow the bracket edges to pull away from the post, thus weakening and possibly disengaging the rail connection.

A need yet remains in the art for a bracket that can adequately secure and support a rail at a post, that has an aesthetically pleasing appearance, and that can be installed quickly and easily. It is to the provision of such a bracket that the present invention is primarily directed.

SUMMARY OF THE INVENTION

Briefly described, in a first preferred form the present invention both overcomes the above-mentioned disadvantages and meets the recognized need for such a device, by providing a one-piece rail bracket for attaching a railing to a post.

Generally, the present device is a one-piece bracket, further comprising means for attaching the bracket to a post. In the preferred embodiment, the bracket preferably is generally rectangular to fit a common style of rail well-known in the art. Within the scope of the present device, it should be understood that the bracket could be a different shape or style, depending on the shape of the corresponding railing.

Preferably, the bracket comprises fastener flanges or bosses having angled throughholes to allow the bracket to be fastened securely to an upright post. The flanges are an integral part of the one-piece bracket and are preferably located in pairs on opposing exterior sides of the bracket to facilitate access for installation and removal. Additionally, due to their paired opposing locations, the flanges provide both vertical and lateral support to reduce rotation of the bracket when fastened to the post. An object of the present invention is to provide a one-piece bracket for attaching a railing to a post.

A further object is to provide a one-piece bracket which securely retains a rail to a post, is strong and sturdy, and is weather-resistant.

Another object of the invention is to provide a rectangular bracket to fit a rectangular rail.

A further object of the invention is to provide a bracket which allows easy installation and removal.

Another object of the present invention is to provide a bracket having decreased screw/nail visibility.

Still a further object of the invention is to provide a bracket with increased strength to withstand forces exerted on the attached handrail and to better maintain a secure positioning of the bracket against the post.

These objects, advantages, and features of the present invention will become more apparent upon reading the following specification in conjunction with the accompanying drawing figures.

BRIEF DESCRIPTION OF THE DRAWING FIGURES

The present invention will be better understood by reading the Detailed Description of the Preferred Embodiment with reference to the accompanying drawing figures, in which:

FIG. 3 is a side elevational view of the bracket of FIG. 1.

FIG. 4 is a front elevational view of the bracket of FIG. 1.

DETAILED DESCRIPTION OF THE PREFERRED EMBODIMENT

In describing the preferred and alternate embodiments of the present invention, specific terminology is employed for the sake of clarity. The invention, however, is not intended to be limited to the specific terminology so selected.

Figure 1:
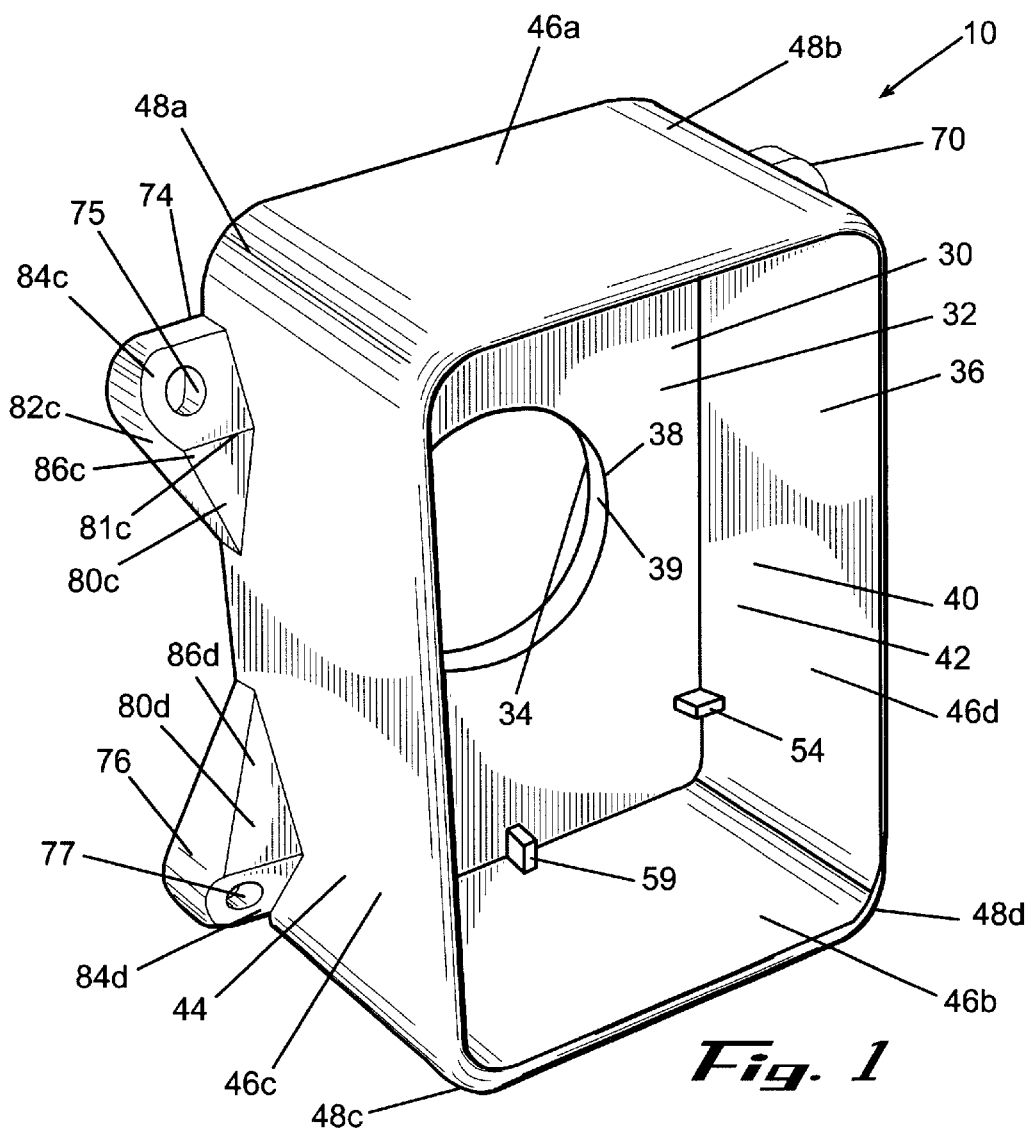
FIG. 1 is a perspective view of the one-piece bracket according to a preferred form of the invention.
Figure 2:
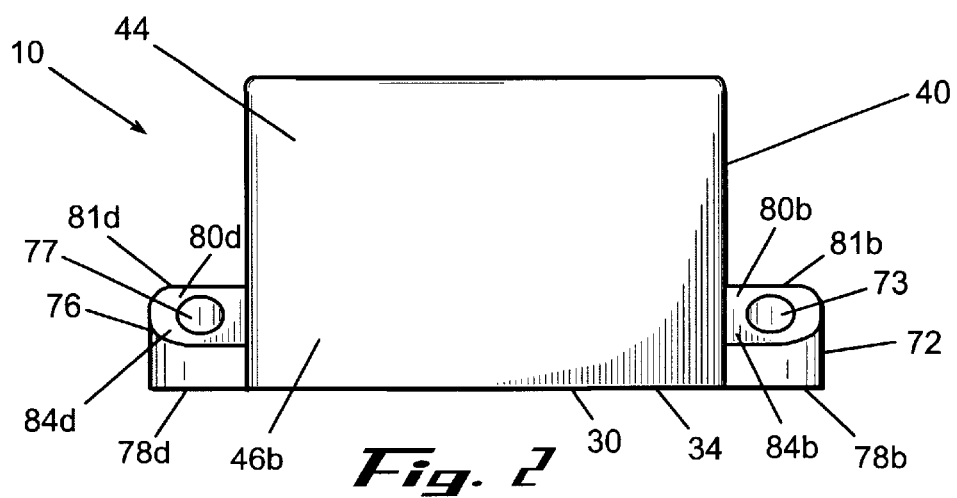
FIG. 2 is a bottom elevational view of the bracket of FIG. 1.
Figure 5:
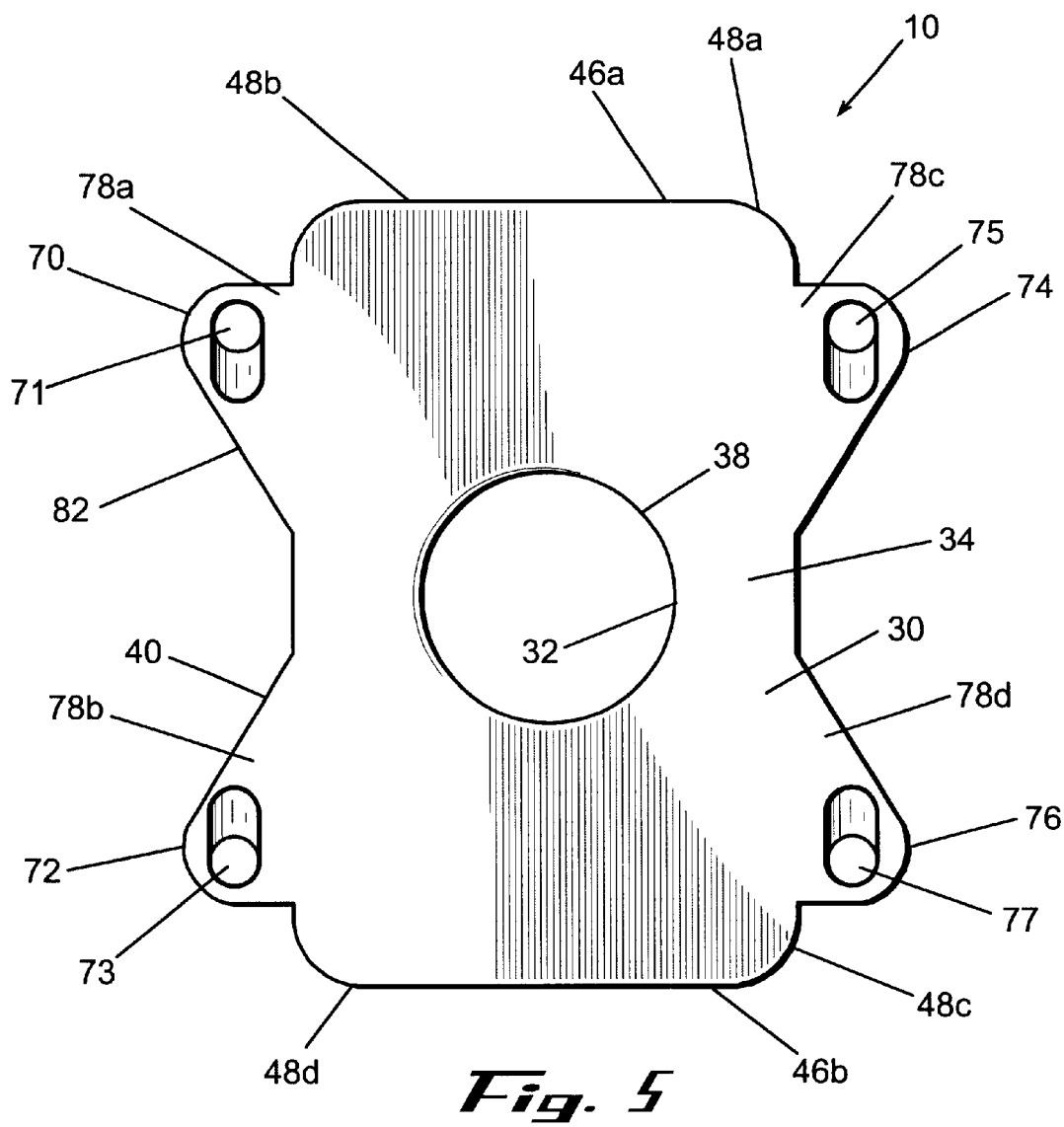
FIG. 5 is a rear elevational view of the bracket of FIG. 1.

Referring now in detail to the drawing figures, wherein like reference numerals represent like parts throughout the several views, FIG. 1 shows a one-piece bracket 10 according to a preferred form of the invention. The bracket 10 preferably comprises a substantially flat rear panel 30 and a peripheral wall 40, the flat rear panel having a front surface 32 and a rear surface 34. The panel 30 defines a centrally located circular opening 38 which is of increasing circumference from front surface 32 to rear surface 34, creating an angled inner surface edge 39 within the circular opening 38. The circular opening 38 allows electrical cables or reinforcing elements (such as a metal pipe) to be run through the rail.

The peripheral wall 40 extends outwardly from the front surface 32 of panel 30, thereby defining a rail receptacle 36 adjacent to the panel 30 and within the peripheral wall 40. The peripheral wall 40 has an inner surface 42, an outer surface 44, a rear edge 41, and a front edge 43, and defines an upper wall 46a, a lower wall 46b, two side walls 46c and 46d, and four corners 48a, 48b, 48c and 48d.

In the preferred form, the bracket 10 is rectangular with rounded corners, similar to the cross-sectional configuration of a specific rail style, to allow the end of a fence rail to fit securely within the rail receptacle 36.

As best seen by reference to FIG. 4, an upper tab (spacer) 50 extends outwardly from the front surface 32 of the panel 30 and is located centrally along the inner surface 42 of the upper wall 46a. Two side tabs (spacers) 52 and 54 extend outwardly from the front surface 32 of the panel 30 and are located on the inner surface 42 of side wall 46d and are aligned with mounting holes 71 and 73, respectively, of side flanges or fastener bosses 70 and 72, respectively. Two side tabs (spacers) 56 and 58 extend outwardly from the front surface 32 of the panel 30 and are located on the inner surface 42 of side wall 46c, and are aligned with the mounting holes 75 and 77, respectively, of side flanges or fastener bosses 74 and 76, respectively. A lower tab (spacer) 59 extends outwardly from the front surface 32 of the panel 30 and is centrally located along the inner surface 42 of the lower wall 46b. Spacers 50, 52, 54, 56, 58 and 59 form a small gap between the rail and the panel 30 thereby preventing the rail from resting flush thereagainst and thus allowing trapped moisture to escape.

As best seen by reference to FIGS. 3 and 4, the bracket 10 further comprises side flanges or fastener bosses 70, 72, 74 and 76 which are provided to be placed flat against the post face for mounting thereto. In this regard, the flanges 70, 72, 74 and 76 each extend from and are formed integral with peripheral wall 40. The flanges 70, 72, 74 and 76 include rear surfaces 78a, 78b, 78c and 78d, respectively, wherein the rear surfaces 78a, 78b, 78c and 78d are flush with the rear surface 34 of panel 30. The flanges 70, 72, 74 and 76 further include peaked front surfaces 80a, 80b, 80c and 80d, respectively, wherein front surfaces 80a and 80b extend from the outer surface 44 of side wall 46d toward outwardly curved edge surfaces 82a and 82b, respectively, and wherein front surfaces 80c and 80d extend from the outer surface 44 of side wall 46c toward outwardly curved edge surfaces 82c and 82d, respectively. The peaked front surfaces 80a, 80b, 80c and 80d are angled bi-directionally rearwardly from peaks 81a, 81b, 81c and 81d, respectively, forming generally square-shaped first portions 84a, 84b, 84c and 84d, respectively, and generally triangularly-shaped second portions 86a, 86b, 86c and 86d, respectively. The flange edges 82a, 82b, 82c and 82d extend from the peaked front surfaces 80a, 80b, 80c and 80d, respectively, to the rear surfaces 78a, 78b, 78c and 78d, respectively, and thus define the generally triangular-shaped boss.

Each flange 70, 72, 74 and 76 includes angled mounting holes 71, 73, 75 and 77, respectively, extending therethrough for receiving a screw, bolt, rivet, nail or other attaching means therethrough for fastening the bracket 10 to an upright post. The angled mounting holes 71 and 75 are formed at an angle directed downwardly and rearwardly from and approximately perpendicular to front surfaces 84a and 84c, respectively. The angled mounting holes 73 and 77 are formed at an angle directed upwardly and rearwardly from and approximately perpendicular to front surfaces 84b and 84d, respectively. The angular positioning of the mounting holes 71, 73, 75 and 77 allows the head of the nail/screw to extend slightly away from the peripheral wall 40 to prevent contact and damage to the peripheral wall 40 during installation.

Flanges 70, 72, 74 and 76 are located in balanced positions on both exterior sides of the bracket to allow for ease in access for installation and removal and to provide against vertical movement and against lateral movement through their opposing locations and their angled surfaces. The flanges 70 and 72 are positioned along the outer surface 44 of side wall 46d. The flanges 74 and 76 are positioned along the outer surface 44 of side wall 46c. Preferably, triangular-shaped first portion 86a extends toward triangular-shaped first portion 86b and triangular-shaped first portion 86c extends toward triangular-shaped first portion 86d.

In the preferred form, the bracket 10 is molded plastic. However, one skilled in the art will recognize that alternative materials may be used such as, for exemplary purposes only, metal, rubber or glass fiber.

In use the bracket 10 is preferably positioned with the rear surface 34 of the panel 30 flush with an upright post and the peripheral walls 40 carrying flanges 70, 72, 74 and 76 vertically oriented. However, one skilled in the art will recognize that alternative orientations may also be utilized, wherein, for instance, the side walls 46c and 46d are horizontally oriented.

In an alternative embodiment, the bracket 10 could be formed with an odd number of side flanges or fastener bosses, wherein at least one flange is located on each outer surface 44 of side walls 46c and 46d, and wherein at least one flange is located along the outer surface 44 of lower wall 46b. Other flange orientation and positioning will be appreciated by one skilled in the art.

In an alternative embodiment, the bracket 10 could be formed without panel 30.

In an alternative embodiment, the bracket 10 could be formed without the spacers 50, 52, 54, 56, 58 and 59.

In an alternative embodiment, the bracket 10 could be formed without the centrally located circular opening 38 in the panel 30.

In an alternative embodiment, the bracket 10 could be formed from more than one piece.

Also contemplated is that the bracket 10 and the flanges 70, 72, 74 and 76 could be of varied shapes to complement a variety of rail cross-sections and of increased size to provide additional support.

Although the preferred form of the present invention is intended for attaching plastic rails to plastic posts, other uses may be possible. For instance, bracket 10 may be used to attach a plastic rail to a wood post; a wood rail to a plastic post, a wood rail to a wood post; a metal rail to a metal post; or any combination of known materials.

Although the preferred material for bracket 10 is PVC, bracket 10 may be any material known or available such as, for exemplary purposes only, other plastics, metal or wood.

Having thus described the preferred forms of the present invention, those skilled in the art will readily recognize that the within disclosure is exemplary only, and that various other alternatives, adaptations, and modifications may be made therein within the spirit and scope of the present invention as set forth in the following claims.

What is claimed is:

1. A bracket for use with fasteners for attaching a rail to a post, comprising:

a peripheral wall defining a rail receptacle adapted to be correspondingly shaped to a cross-sectional shape of the rail, and adapted for receiving an end of the rail within said rail receptacle; and a plurality of fastener flanges extending outwardly from said peripheral wall for attaching said bracket to the post using fasteners, wherein said fastener flanges each have a rear surface, a front surface with a first portion that is angled relative to said fastener flange rear surface, and a mounting throughhole defined through said fastener flange rear surface and front surface first portion and angled relative to said peripheral wall.

2. The bracket of claim 1, wherein each of said front surface first portions of said fastener flanges is perpendicular to an axis of said mounting throughhole defined therein.

3. The bracket of claim 1, wherein said plurality of fastener flanges comprise four fastener flanges, with pairs of said fastener flanges being located on opposing sides of said peripheral wall.

4. The bracket of claim 1, wherein each of said fastener flange front surfaces has a second portion that is triangular.

5. The bracket of claim 4, wherein said first portion and said second portion of each of said fastener flange front surfaces are angled relative to each other.

6. A bracket for use with fasteners for attaching a rail to a post, comprising:

a panel having a front surface and a rear surface;

a peripheral wall extending forwardly from said panel, said peripheral wall defining a rail receptacle having a profile adapted to correspond to a cross-sectional shape of the rail and adapted for receiving an end of the rail therewithin;

a plurality of fastener bosses positioned along said peripheral wall and protruding therefrom for fastening said bracket to the post; and a plurality of spacers extending from said front surface of said panel, wherein said spacers provide a gap between said panel and an end of the rail when inserted in said rail receptacle.

7. The bracket of claim 6, wherein said plurality of fastener bosses comprises at least three bosses spaced from one another.

8. The bracket of claim 6, wherein said bracket is formed as a single piece.

9. The bracket of claim 8, wherein said plurality of fastener bosses comprise four fastener bosses, with pairs of said fastener bosses being located on opposing sides of said peripheral wall.

10. The bracket of claim 9, wherein said peripheral wall is generally rectangular and said fastener bosses are arranged in adjacent corners of said rectangular peripheral wall.

11. The bracket of claim 8, wherein each of said fastener bosses defines a fastener bore therethrough which is angled relative to said peripheral wall.

12. The bracket of claim 8, wherein said bracket is rectangular.

13. A molded, one-piece bracket for use with fasteners for attaching a rectangular rail to a post, comprising:

a panel having a front surface and a rear surface;

a rectangular peripheral wall extending forwardly from said front surface of said panel, said peripheral wall defining a rectangular rail receptacle having a profile adapted to correspond to a rectangular cross-sectional shape of the rail, and adapted for receiving an end of the rail therewithin; and four fastener bosses positioned along said peripheral wall and protruding laterally therefrom for fastening said bracket to the post, wherein pairs of said fastener bosses are located on opposing sides of said peripheral wall, and wherein said fastener bosses each have a rear surface that is parallel with said panel rear surface, a front surface with a first portion that is angled relative to said fastener boss rear surface, and a fastener bore defined through said fastener boss rear surface and front surface first portion that is angled relative to said peripheral wall; and a plurality of spacers extending forwardly from said front surface of said panel, wherein said spacers provide a gap between said panel and an end of the rail when inserted therein.

14. The bracket of claim 1, wherein said peripheral wall has a front edge and a rear edge opposite therefrom, and said fastener flange rear surfaces are parallel with a plane defined by said peripheral wall rear edge.

15. The bracket of claim 14, further comprising a plurality of spacers extending inwardly from said peripheral wall at said rear edge thereof, wherein said spacers provide a gap between said peripheral wall rear edge and an end of the rail when inserted in said rail receptacle.

16. The bracket of claim 15, further comprising a panel having a rear surface and having a front surface adjacent said peripheral wall rear edge, wherein said spacers are disposed adjacent said panel front surface.

17. The bracket of claim 11, wherein each of said fastener bosses has a rear surface that is parallel with said panel rear surface and a front surface with a first portion that is angled relative to said fastener boss rear surface, and wherein said fastener bore is defined through said fastener boss rear surface and front surface first portion.

18. The bracket of claim 8, wherein said spacers are rectangular.

19. The bracket of claim 8, wherein said spacers are disposed adjacent said peripheral wall.

20. The bracket of claim 13, wherein said four fastener bosses extend outwardly from an outer surface of said peripheral wall and said plurality of spacers comprises at least four spacers that extend inwardly from an inner surface of said peripheral wall at positions immediately opposite from said four fastener bosses.

* * * * *